United States Patent
Gibberd et al.

(10) Patent No.: US 7,859,128 B2
(45) Date of Patent: Dec. 28, 2010

(54) DEPLOYMENT APPARATUS FOR SUBMERGED POWER PLANT

(75) Inventors: George Gibberd, Bristol (GB); Christopher Huxley-Reynard, Bristol (GB); Tania Lake, Bristol (GB)

(73) Assignee: Tidal Generation Limited, Bristol (GB)

( * ) Notice: Subject to any disclaimer, the term of this patent is extended or adjusted under 35 U.S.C. 154(b) by 473 days.

(21) Appl. No.: 12/092,045

(22) PCT Filed: Oct. 13, 2006

(86) PCT No.: PCT/GB2006/003823

§ 371 (c)(1), (2), (4) Date: Apr. 29, 2008

(87) PCT Pub. No.: WO2007/051968

PCT Pub. Date: May 10, 2007

(65) Prior Publication Data

US 2009/0045631 A1    Feb. 19, 2009

(30) Foreign Application Priority Data

Oct. 31, 2005    (GB)    .................................. 0522133.8

(51) Int. Cl.
*H02P 9/04*    (2006.01)
*F03B 13/00*    (2006.01)

(52) U.S. Cl. .............................. 290/54; 290/43; 290/53

(58) Field of Classification Search .................. 290/42, 290/43, 53, 54; 60/497, 498, 495, 496, 501, 60/502, 504, 505, 698, 500, 499; 405/75, 405/76; 417/331, 333, 330; 416/31
See application file for complete search history.

(56) References Cited

U.S. PATENT DOCUMENTS 4,355,511 A * 10/1982 Jones ........................... 60/507
5,774,421 A    6/1998 Vincent, II (Continued)

FOREIGN PATENT DOCUMENTS

GB    980575 A    1/1965

(Continued)

OTHER PUBLICATIONS

U.K. Search Report dated Jun. 20, 2006 for Application No. GB0522133.8 published May 2, 2007 under Publication No. GB 2431628 A, U.K. Patent Office.

(Continued)

*Primary Examiner*—Julio Gonzalez
(74) *Attorney, Agent, or Firm*—Husch Blackwell LLP Welsh Katz

(57) ABSTRACT

Power generating equipment comprising a buoyant power generating apparatus and a support structure for the power generating apparatus, which support structure, in use, is disposed on the bed of a body of water, the power generating apparatus comprising a motor-driven winching device having a tether which is connectable at its free end to the support structure whereby retraction of the tether causes the power generating apparatus to be drawn downwardly through the body of water into engagement with the support structure, the power generating apparatus and the support structure being provided with means for aligning and latching the power generating apparatus with respect to the support structure upon engagement with the support structure.

16 Claims, 3 Drawing Sheets

U.S. PATENT DOCUMENTS

| | | | |
|---|---|---|---|
| 7,737,568 B2 * | 6/2010 | Vowles et al. | 290/42 |
| 2004/0070210 A1 * | 4/2004 | Johansen et al. | 290/43 |
| 2007/0284882 A1 * | 12/2007 | Costin | 290/43 |
| 2008/0226398 A1 * | 9/2008 | Gibberd et al. | 405/223 |
| 2010/0230971 A1 * | 9/2010 | Mackie | 290/54 |

FOREIGN PATENT DOCUMENTS

| | | |
|---|---|---|
| WO | WO 02/066828 A1 | 8/2002 |
| WO | WO 2004/015264 A1 | 2/2004 |
| WO | WO 2004/048774 A1 | 6/2004 |
| WO | WO 2004/085845 A1 | 10/2004 |
| WO | WO 2005057006 A1 * | 6/2005 |
| WO | WO 2005/061887 A1 | 7/2005 |

OTHER PUBLICATIONS

International Search Report dated Feb. 6, 2007 for International Application No. PCT/GB06/03823 published May 10, 2007 under Publication No. WO 2007/051968 A1, WIPO.

* cited by examiner

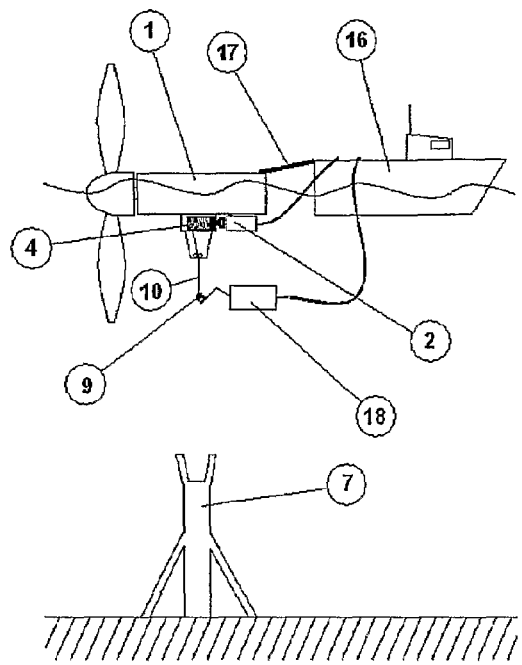
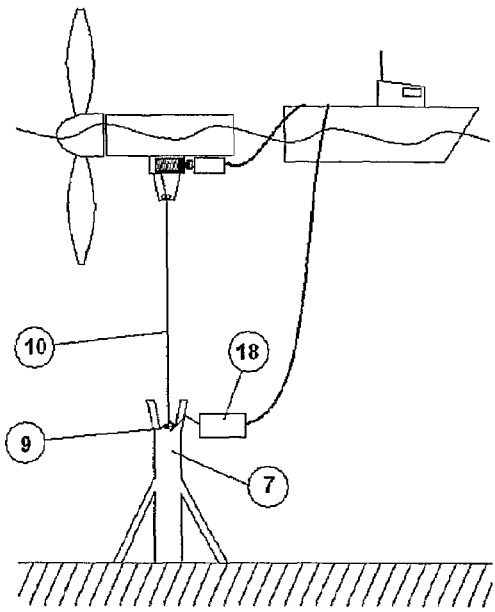
Figure 4a
Figure 4b
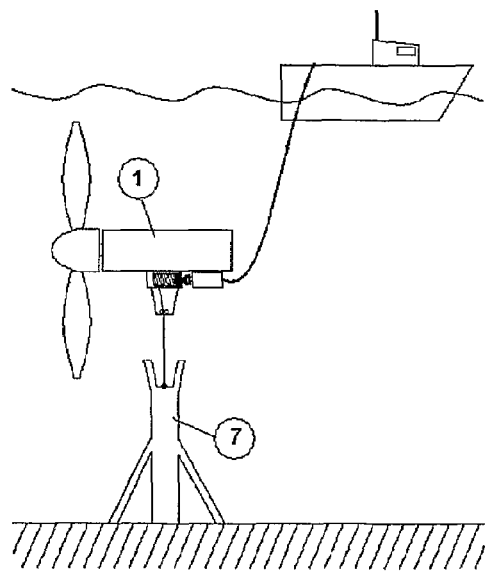
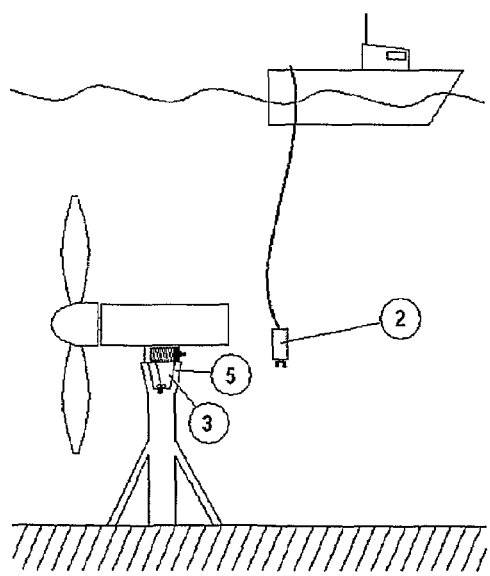
Figure 4c
Figure 4d

DEPLOYMENT APPARATUS FOR SUBMERGED POWER PLANT

This invention relates to the deployment and retrieval of submerged power generating apparatus designed to generate electricity from tidal currents or ocean waves.

A key aspect in the design of water current and wave generating equipment is the method by which the power generating apparatus (PGA) is periodically accessed for inspection and maintenance, and deployed again for operation. This can have a significant effect on the cost of maintaining the entire machine over its lifetime.

Installations in which the PGA is fully submerged during normal operation and must on occasion be brought to the surface for inspection/maintenance can be divided into two categories:
1. Schemes employing a surface breaking support structure (such as a mono-pile). The structure itself is used as a guide to allow the PGA to be raised to the surface using some form of mechanical lifting device (e.g. hydraulic rams, surface mounted winch) or possibly using the force of buoyancy.
2. Schemes where the support structure lies submerged (or mostly submerged) during normal operation. Such devices may consist of:
   a PGA mounted directly to a seabed foundation;
   a PGA attached by cables or long articulated arms to foundations on the seabed, wherein the level of the PGA in the water column during operation is determined by its own positive buoyancy;
   a PGA mounted on a submerged lattice or tubular framework structure that supports the PGA mid water column.

Water current or wave generating devices are, by their very nature, deployed in extreme marine environments where weather and sea state conditions can often make marine operations difficult. The speed and simplicity of the method of deployment and retrieval of the PGA, and in particular the tolerance of this method to moderately bad weather and sea state conditions are therefore particularly important.

Generally speaking, it is considerably more difficult to deploy a submerged PGA than it is to retrieve it. The deployment requires accurate alignment and attachment of the PGA with the support structure underwater, where it is difficult to see what is happening and where accurate control of the PGA position may be difficult to achieve.

Retrieval of the PGA is easier because, once detached, the PGA can be raised off the support structure quickly without the need for careful control of its alignment.

Known methods for deploying and retrieving submerged PGAs to/from the surface comprise:
a crane or winch mounted on a surface vessel is used to lower a negatively buoyant (i.e. heavier than water) PGA onto a support structure, with no additional guiding apparatus. Cameras, remotely operated vehicles (ROVs) or divers may be used to monitor the position of the PGA as it is lowered. The PGA is raised in a similar manner. The vessel required to lower/raise a heavy PGA is expensive and may not be available at short notice. The constant motion of the vessel on the surface can pose problems for the position control of the PGA, particularly during its deployment.

A telescopic tube normally housed inside the support structure can be raised to the surface to allow the PGA to be fitted to it for deployment. This telescopic tube guides the negatively buoyant PGA straight up and down, to and from the surface. The weight of the PGA and the telescopic tube is supported by a deck-mounted winch/crane on a surface vessel. This method addresses the issue of position control of the PGA, allowing the lifting and lowering operations to be performed more quickly and easily. The scheme still requires vessel-mounted heavy lifting equipment, and there is a considerable overhead associated with the telescopic tube, which is only used on an occasional basis. There is also the possibility of the telescopic tube jamming, with the associated risk that the machine is left in a potentially dangerous state should weather conditions deteriorate.

Guide wires running from a surface vessel down to a support structure are used to guide the PGA as it is lowered and raised through the water column. The correct tensioning of these guide wires from the surface vessel requires accurate position holding and possibly heave compensation equipment, which is expensive. In the case of a water current generating machine where there is only a short period of relatively slack water available, the deployment and recovery of the guide wires is a time-consuming operation and there may be insufficient time.

A buoyant but submerged PGA, attached to the seabed by mooring cables, is raised and lowered using a crane/winch mounted on the deck of a surface vessel. A tether runs down from the crane, passes through a seabed anchor point/pulley block, and connects to one or more of the seabed mooring cables. By paying out/pulling in the tether from the surface vessel the seabed cable moorings are slackened/tightened, allowing the PGA to rise/fall to/from the surface under action of its own buoyancy. This scheme requires careful detail design of the seabed anchor point/pulley block, as well as the means by which the seabed mooring cables are attached to the tether and fed through the block. These issues pose significant practical difficulties in the underwater environment, particularly in terms of accessing such equipment for maintenance.

STATEMENT OF INVENTION

In accordance with a first aspect of the invention, there is provided power generating equipment comprising a buoyant power generating apparatus and a support structure for the power generating apparatus, which support structure, in use, is disposed on the bed of a body of water, the power generating apparatus comprising a motor-driven winching device having a tether which is connectable at its free end to the support structure whereby retraction of the tether causes the power generating apparatus to be drawn downwardly through the body of water into engagement with the support structure, the power generating apparatus and the support structure being provided with means for aligning and latching the power generating apparatus with respect to the support structure upon engagement with the support structure.

In a second aspect of the invention, there is provided a method of deploying a submersible buoyant power generating apparatus onto a support structure submerged beneath a body of water, the power generating apparatus comprising a winching device and a tether which is retractable by the winching device, the method comprising the steps of attaching the free end of the tether to the submerged support structure; and operating the winching device to winch the power generating apparatus towards the submerged support structure.

BRIEF DESCRIPTION OF THE DRAWINGS

For a better understanding of the present invention, and to show more clearly how it may be carried into effect, reference will now be made, by way of example, to the following drawings, in which:

FIGS. 4a to 4d illustrate a method of deploying the power generating equipment of FIG. 1.

DETAILED DESCRIPTION OF THE PREFERRED EMBODIMENTS

Figure 1:
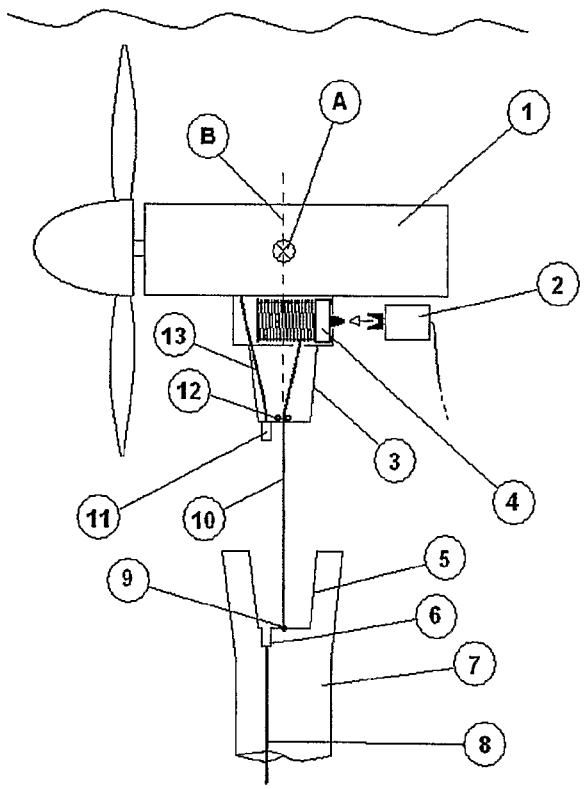
FIG. 1 shows power generating equipment attached to a support structure by a tether.

The power generating equipment shown in FIG. 1 comprises a buoyant power generating apparatus 1 (PGA). In this instance, the PGA 1 is a water current generating device; however, it is to be understood that the invention is equally applicable to any form of power generating apparatus. Also shown in FIG. 1 is part of a support structure 7, which is positioned on the bed of a body of water. The support structure 7 comprises the female part 5 of an alignment means, while the PGA 1 comprises the male part 3 of the alignment means. It will be appreciated that the female and male parts of the alignment means could equally be positioned in the opposite orientation without affecting operation of the invention.

The term "alignment means" as used in this specification is intended to encompass any means by which the PGA 1 and support structure 7 may be brought together in a defined alignment. For example, such alignment means may not have male and female parts as described herein, but two parts which mutually fit together in a predefined relationship.

The positive buoyancy of the PGA 1 may either be inherent to the PGA 1 itself, or, if the PGA 1 is not inherently buoyant, buoyancy aids may be added to the PGA 1. Positioned on the male part 3 of the alignment means is an electrical connector 11. A power cable 13 runs from an electrical generator within the PGA 1 and terminates at the electrical connector 11. A complementary electrical connector 6 is positioned in the female part 5 of the alignment means, with a further power cable 8 running from the complementary electrical connector 6 to shore. In this way, when the PGA 1 and support structure 7 are brought together, as will be described in more detail below, the power generated by the PGA 1 may be supplied to shore. There may also exist certain other connections between the male and female parts 3, 5, for example, fibre optic connectors or hydraulic connectors.

Also shown attached to the PGA 1 is a winching device 4. The winching device 4 is powered by a motor drive 2. In FIG. 1, the winching device 4 is shown permanently attached to the PGA 1, and the motor unit 2 is shown as being detachably connected to the winching device 4. However, the winching device 4 may be detachable from the PGA 1, and the motor unit 2 may be permanently attached to either the PGA 1 itself or the winching device 4. An advantage of permanently attaching the motor unit 2 is that it reduces the number of operations that are required to deploy the PGA 1. However, advantages of detachably connecting the motor unit 2 are that only one motor unit 2 may be required to deploy multiple PGAs, and the motor unit 2 will be easier to maintain.

A tether 10 extends from the winching device 4, through guides 12 in the PGA 1, to a tether connection 9 which is connected to the support structure 7. The tether 10 can be any flexible length of line, rope, cable, chain, or similar means.

The centre of buoyancy A of the PGA 1 is positioned in line with the central mating axis B of the alignment means 3, 5. The guides 12 may also be positioned in line with the central mating axis B of the alignment means 3, 5. This has the advantage that the PGA 1 will be lowered in a stable manner, ensuring that the PGA 1 remains suitably orientated in terms of pitch, roll and lateral position.

Figure 2:
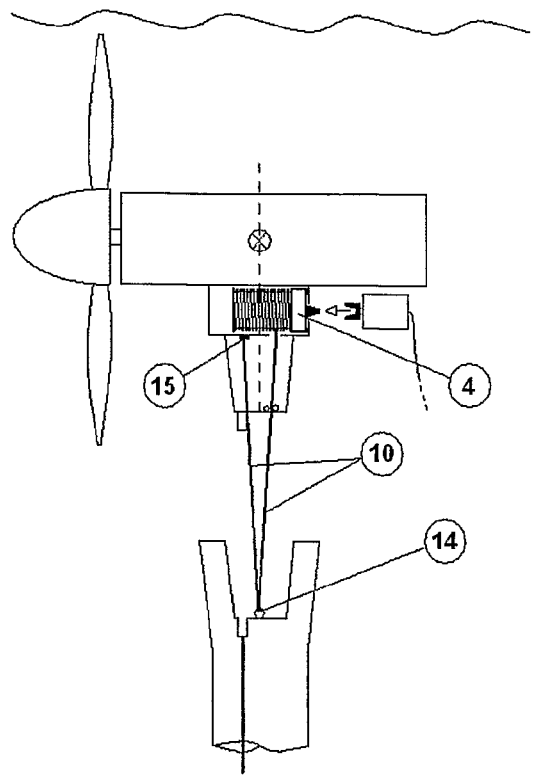
FIG. 2 corresponds to FIG. 1 but shows an alternative embodiment.

In the embodiment shown in FIG. 2, the tether 10 is made up of two falls which pass through a pulley block 14 mounted on the support structure 7. The end of the tether 10 is attached to a hard point 15 on the PGA. Further falls may be added if required. By using two or more falls, the mechanical advantage can be increased, allowing for a reduction in the power requirement of the motor unit 2.

Figure 3:
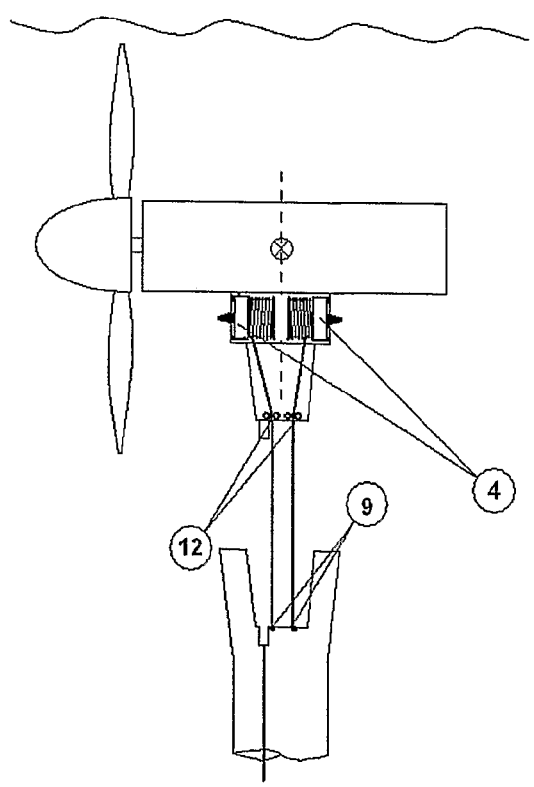
FIG. 3 corresponds to FIG. 1 but shows a third embodiment.

In the embodiment shown in FIG. 3, a pair of winching devices 4, each with a respective tether 10, guide 12 and tether connection 9, is used. Further winching devices may be used as necessary. The plurality of winching devices could each be powered by a corresponding plurality of motor units, or by a single motor unit via a connecting shaft or gearbox. By using more than one winching device, the stability and orientation control of the PGA could be improved during deployment. Further, extra winching devices provide extra power to pull the PGA down through the water column.

FIG. 4a shows the first step in deploying the PGA 1 of FIG. 1 on the support structure 7. The PGA 1 is initially floating in a body of water, and is towed to the required position above the support structure 7 by a surface vessel 16. The PGA 1 is connected to the vessel 16 by a line 17.

In this example, a motor unit 2 is detachably connected to the winching device 4, and linked with the surface vessel 16 via a second line. This second line may be used to power or control the motor unit 2, or it may simply provide a means for retrieving the motor unit 2 after operation.

A remotely operated vehicle (ROV) 18 is used to take the tether connection 9 down through the water column and attach it to the top of the support structure 7, whilst the winching device 4 pays out the tether 10 (FIG. 4b). Divers, or any other suitable means, could also be used to perform this task.

In another embodiment of the invention, the support structure 7 may comprise an automatic release buoy (not shown), which on activation deploys a separate tether to the surface for attachment to the winching device 4. This has the advantage that a ROV 18 or diver will not be required to attach the tether connection 9 to the support structure 7 itself.

At this stage, the PGA 1 is cast off from the surface vessel 16 by releasing the line 17.

The motor unit 2 is then used to power the winching device 4, thereby pulling the PGA 1 down through the water column towards the support structure 7 (FIG. 4c).

FIG. 4d shows the PGA 1 after it has mechanically mated with the support structure 7. The male 3 and female 5 parts of the alignment means connect together, automatically aligning the PGA 1 in its correct orientation, and the two latch together so that the PGA 1 is retained on the support structure by the latched alignment means. In this example, the electrical connections 6, 11 (and fibre optic and hydraulic connections if there are any) are also made automatically upon mating of the male 3 and female 5 parts of the alignment means. This may be through the use of stab-plate type underwater mate connectors. Alternatively, electric, hydraulic, and/or fibre optic connections may be performed by divers or ROVs.

As shown in FIG. 4d, the motor unit 2 is detached from the winching device 4 and retrieved by the surface vessel 16. Because the PGA 1 is retained on the support structure 7 by the latched alignment means, the tether 10 is relieved of tension and so the removal of the motor unit 2 will not result in unwinding of the tether 10 from the winching device under the buoyancy of the PGA 1.

The subsequent retrieval of the PGA 1 is achieved by the steps shown in FIGS. 5a to 5d.

Figure 5A:
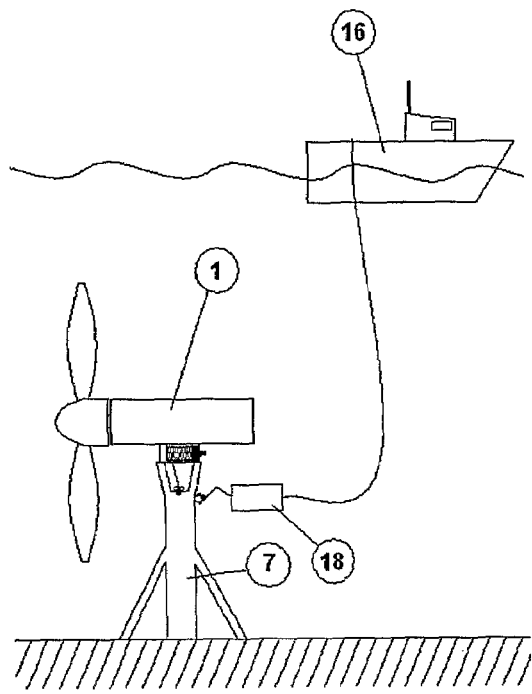
FIGS. 5a to 5d illustrate a method of retrieving the power generating equipment of FIG. 1.

FIG. 5a shows the PGA 1 attached to the support structure 7 as described above. A remotely operated vehicle (ROV) 18 is deployed from the surface vessel 16 to release the latch holding the PGA 1 and the support structure 7 together. Alternatively, this action could be performed by a diver or other suitable means.

Figure 5B:
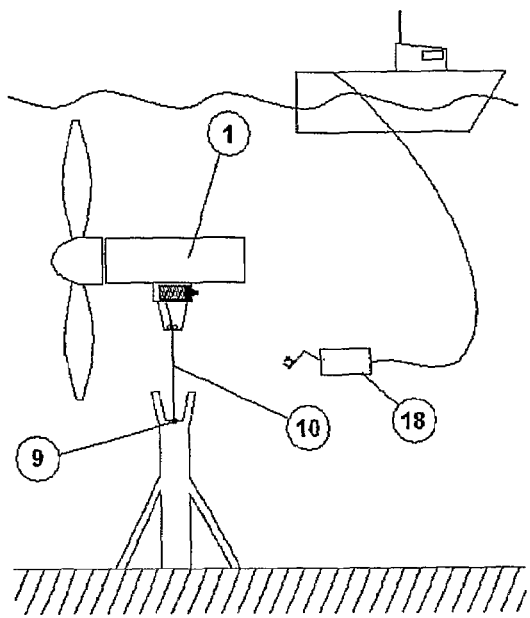

FIG. 5b shows the situation after the latch between the PGA 1 and the support structure 7 has been released. Under its own positive buoyancy, the PGA 1 rises towards the surface whilst the winching device 4 pays out the tether 10. The tether 10 remains connected to the support structure during this stage. However, the motor unit 2 may be used to power the winching device 4 if necessary. The tether connection 9 preferably remains attached to the support structure 7 during this stage, to avoid the PGA 1 rising uncontrollably under its own buoyancy.

Figure 5C:
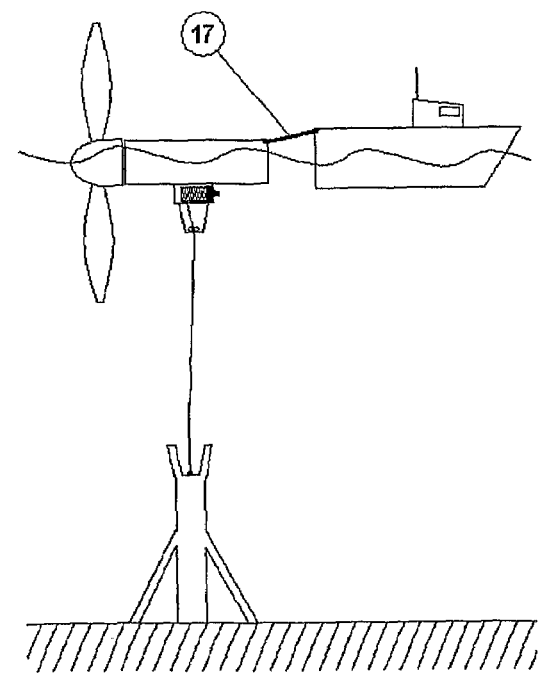

FIG. 5c shows the situation when the PGA 1 has reached the surface. The PGA 1 is made fast to the surface vessel 16 by the line 17.

Figure 5D:
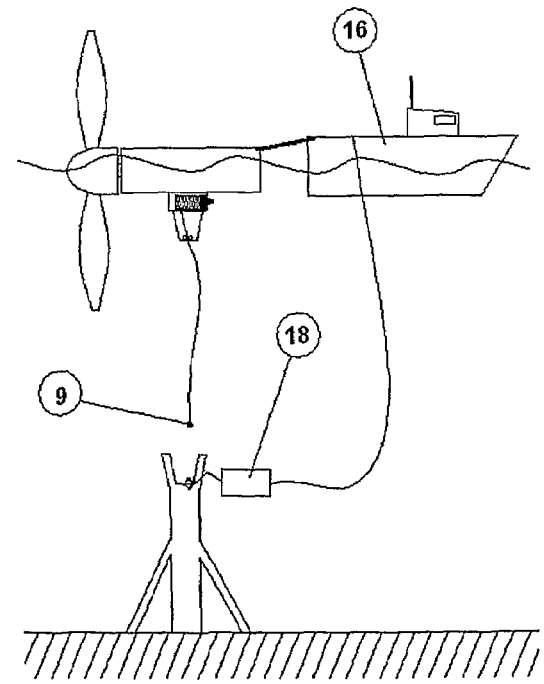

As shown in FIG. 5d, the ROV 18 is then used to disconnect the tether connection 9 from the support structure 7. Again, a diver or other suitable means may be used to perform this task. The motor unit 2 then powers the winching device 4 to retract the tether 10.

Although some inspection or maintenance of the PGA 1 may be performed while the PGA 1 floats above the support structure 7, it will be more usual for the PGA 1 to be towed by the vessel 16 to shore or to a suitably equipped ship for such maintenance.

The invention has the particular advantage that no large surface vessel with a heavy lift crane/winch is required to deploy the PGA 1 onto the support structure 7, or subsequently to retrieve it. This obviates the need for heavy vessel lifting equipment and eliminates problems associated with the motion/heave of the vessel pulling in an unpredictable manner on the PGA. Consequently, it is possible to deploy or retrieve the PGA 1 in moderately severe weather conditions.

A further advantage is that no mechanical guide arrangement is required whilst lowering the PGA down through the water column, since the natural buoyancy of the PGA keeps the tether pulling in a predominantly vertical direction.

A further advantage is that no seabed-mounted anchor/pulley block apparatus or complex tether connection devices are required.

A further advantage is the accessible location of the winch and tether on the PGA where they can be serviced whenever the PGA is retrieved.

A further advantage is that deployment or retrieval can be safely aborted at any time by releasing the tether from the support structure or cutting it, thus allowing the PGA to float freely to the surface and be recovered by a surface vessel.

The invention claimed is:

1. Power generating equipment comprising:
   a buoyant power generating apparatus; and
   a support structure for the power generating apparatus, which support structure, in use, is disposed on the bed of a body of water, and which support structure defines alignment and latching means for the power generating apparatus,
   wherein the power generating apparatus comprises:
   a generating unit having a centre of buoyancy positioned to maintain a stable pitch and roll attitude;
   alignment and latching means adapted to align and latch the power generating apparatus with corresponding alignment and latching means on the support structure, the alignment and latching means defining a mating axis; and
   a motor-driven winching device having a flexible tether which is connectable at its free end to the support structure whereby, in use, retraction of the tether causes the power generating apparatus to be drawn downwardly through the body of water into engagement with the support structure, such that a net buoyancy force acting on the generating unit is brought substantially into line with the mating axis and wherein, during such retraction of the tether, the power generating apparatus is connected to the support structure by only the flexible tether.

2. Equipment as claimed in claim 1, wherein the alignment and latching means include electrical, hydraulic and fibre optic connectors between the power generating apparatus and support structure.

3. Equipment as claimed in claim 1, wherein a motor drive unit is detachably connected to the winching device.

4. Equipment as claimed in claim 3, wherein the motor drive unit is mounted on or is part of a remotely operated vehicle.

5. Equipment as claimed in claim 1, wherein a motor drive unit is built permanently into the winching device.

6. Equipment as claimed in claim 1, wherein a temporary buoyancy device is attached to the power generating apparatus.

7. Equipment as claimed in claim 1, wherein the tether has at least two falls at the support structure.

8. Equipment as claimed in claim 1, wherein the winching device comprises a plurality of winches and respective tethers.

9. A method of deploying a submersible buoyant power generating apparatus onto a support structure submerged beneath a body of water, which support structure defines alignment and latching means for the power generating apparatus, the power generating apparatus comprising a generating unit having a centre of buoyancy positioned to maintain a stable pitch and roll attitude, alignment and latching means adapted to align and latch the power generating apparatus with corresponding alignment and latching means on the support structure, the alignment and latching means defining a mating axis, and a motor-driven winching device having a flexible tether which is connectable at its free end to the support structure and which is retractable by the winching device, and the power generating apparatus further comprising guides arranged to guide the tether substantially in line with the mating axis, the method comprising:
   attaching a free end of the tether to the submerged support structure, such that the power generating apparatus is connected to the support structure by only the flexible tether;

operating the winching device by retracting the tether to winch the power generating apparatus towards the submerged support structure;

aligning the power generating apparatus with the support structure such that a net buoyancy force acting on the generating unit is brought substantially into line with the mating axis; and latching the power generating apparatus to the support structure.

10. A method as claimed in claim 9, further comprising:

connecting electrical, hydraulic and fibre optic connections between the power generating apparatus and support structure automatically at the same time as the latching of the power generating apparatus and support structure.

11. A method as claimed in claim 9, further comprising:

connecting electrical, hydraulic and fibre optic connections between the power generating apparatus and support structure by means of a diver or remotely operated vehicle after the latching of the power generating apparatus and support structure.

12. A method as claimed in claim 9, wherein the winching device is operated by a motor drive unit.

13. A method as claimed in claim 12, wherein the motor drive unit is detached from the winching device after latching of the power generating apparatus to the support structure.

14. A method as claimed in claim 13, wherein the motor drive unit remains connected to the winching device after latching of the power generating apparatus to the support structure.

15. A method as claimed in claim 9, wherein the winching device remains attached to the power generating apparatus after latching of the power generating apparatus to the support structure.

16. A method as claimed in claim 9, wherein the power generating apparatus is subsequently returned to the surface of the body of water by releasing the latching of the power generating apparatus to the support structure and allowing the power generating apparatus to rise while the tether is paid out by the winching device.

* * * * *